United States Patent
Turner

[15] 3,653,832
[45] Apr. 4, 1972

[54] HYDROGEN PEROXIDE FROM ALKYLHYDROPEROXIDES

[72] Inventor: John O. Turner, West Chester, Pa.
[73] Assignee: Sun Oil Company, Philadelphia, Pa.
[22] Filed: Jan. 13, 1970
[21] Appl. No.: 2,681

[52] U.S. Cl. .................................23/207.5, 260/610 R
[51] Int. Cl. ...................................C01b 15/02, C07c 13/00
[58] Field of Search ..........23/207, 207.5; 260/502 R, 610 A, 260/610 B, 610 D, 610 R; 252/397

[56] References Cited

UNITED STATES PATENTS 2,497,814  2/1950  Elston....................................23/207.5
2,522,016  9/1950  Denison, Jr. et al................260/610 B

*Primary Examiner*—Oscar R. Vertiz
*Assistant Examiner*—Hoke S. Miller
*Attorney*—George L. Church, Donald R. Johnson, Wilmer E. McCorquodale, Jr. and Stanford M. Back

[57] ABSTRACT

When aliphatic and alicyclic hydroperoxides are converted to their corresponding peroxides with about a 50 percent concentration of acid, hydrogen peroxide can also be recovered in good yield from the reaction mixture by carrying out the process in the presence of a stannate salt or an orthophosphoric acid stannous halide reaction product.

5 Claims, No Drawings

HYDROGEN PEROXIDE FROM ALKYLHYDROPEROXIDES

BACKGROUND OF THE INVENTION

This invention relates to a novel method of preparing hydrogen peroxide. More particularly, it relates to a method of forming hydrogen peroxide during the conversion of an aliphatic or alicyclic hydroperoxide with a 30 to 65 percent concentration of acid to the corresponding peroxide.

In U.S. Pat. No. 2,522,016 there is taught the preparation of organo peroxides by contacting an organo hydroperoxide with a strong acid. It is specifically stated in this patent that the reaction does not evolve hydrogen peroxide or oxygen.

U.S. Pat. No. 1,958,204 teaches that solutions of hydrogen peroxide are stable in the presence of sulfuric or phosphoric acid if the pH is maintained at about 1 to 3. This patent further teaches that stability of the hydrogen peroxide solution is improved if sodium stannate is added, provided that the pH of the solution is maintained at greater than 3.5, and preferably in the range of from about 4 to 5, since the tin compound is precipitated from solution at pH's below 3.5, unless other salts are added, in which case the pH may be as low as 2.0.

Finally, W. C. Schumb, in Industrial and Engineering Chemistry, Vol. 41, No. 5, pages 992–1003 (1949) again indicates that hydrogen peroxide is most stable at pH 4, and that it decomposes at high rate at pH's above and below this point. This article also shows that at these pH ranges the addition of certain compounds such as stannate or pyrophosphate salts will prolong the stability over long periods of time by stabilizing these solutions against the effects of metal ions such as iron, copper, and the like which catalyze the decomposition of the hydrogen peroxide.

It is thus evident that none of these foregoing references, or any of the prior art cited in these references, constitutes a teaching of the possibility of recovering hydrogen peroxide during the conversion of an organo hydroperoxide to its corresponding peroxide in an acid medium, and certainly not at pH's substantially below 1.0. Indeed, U.S. Pat. No. 2,522,016 clearly teaches the opposite, i.e., that hydrogen peroxide is not produced when an hydroperoxide is treated with an acid.

SUMMARY OF THE INVENTION

Notwithstanding these prior art teachings, it has now been found that hydrogen peroxide can be obtained in good yield together with an alkyl peroxide by reacting an aliphatic or alicyclic hydroperoxide with 30 to 65 percent concentrations of acid in the presence of stannate salt or an orthophosphoric acid stanous halide reaction product. The pH of the reaction medium at these acid concentrations is below about 0.5

DESCRIPTION OF THE INVENTION

The process of this invention is conveniently carried out by adding the desired hydroperoxide to an aqueous acidic medium to which has also been added a selective additive, allowing the reaction to proceed for from 5 to 15 hours at temperatures of from 40° to 65° C., and then recovering and separating the resulting mixture of aliphatic or alicyclic peroxide and hydrogen peroxide.

The additives which have been found to ensure the formation and stabilization of the hydrogen peroxide in this type of reaction medium comprise alkali metal salts of tin such as sodium stannate, or the reaction product of orthophosphoric acid and stannous halide (as taught in U.S. Pat. No. 2,091,178) in amounts which provide from 0.01 to 3.0 grams of additive for each 9 to 10 grams of hydroperoxide starting material, and preferably about 0.1 to 1.5 grams of additive.

It is desirable, although not essential, that the reaction be free of those metal ions which are particularly known to catalyze the decomposition of hydrogen peroxide, namely iron, copper or chromium ions. Thus, it is preferred that the starting materials avoid salts containing these metals wherever possible.

The acids employed in this process include the inorganic acids such as hydrochloric, phosphoric, polyphosphoric, sulfuric, and perchloric, as well as various sulfonic acids or acid-treated molecular sieves. Of these, sulfuric acid is preferred. It is important that the acid concentration be between about 30 to 65, and preferably 45 to 55 weight percent based on the total weight of aqueous acid solution, to ensure best results. At these concentrations, the pH of the reaction medium is below about 0.5.

The hydroperoxide starting materials include both aliphatic and alicyclic compounds having from about three to 12 carbon atoms. These hydroperoxides may be either secondary or tertiary compounds, although the latter type are more reactive and are thus preferred. Included amongst the hydroperoxides useful in carrying out this process are such compounds as t-butyl hydroperoxide or sec.-butylhydroperoxide, 1-methylcyclopentylhydroperoxide, 1-methylcyclohexylhydroperoxide, and the like. When these compounds are treated in accordance with this process, there are obtained the corresponding di-aliphatic or di-alicyclic peroxides together with hydrogen peroxide in good yield.

The organic peroxide and hydrogen peroxide may readily be recovered from the reaction medium by phase separation, i.e., separation of the organic phase containing the peroxide from the aqueous acid phase containing the hydrogen peroxide. Advantageously, the hydrogen peroxide may be left in its acidic medium and used directly in that form in such reactions as the Baeyer-Villiger oxidation, in the epoxidation of olefins and the like.

This invention also relates to a process for stabilization of hydrogen peroxide in an aqueous acidic medium containing an aliphatic or alicyclic peroxide which comprises adding an alkali metal stannate or the reaction product of orthaphosphoric acid and a stannous halide to said aqueous acidic medium wherein the amount of acid and stannate stabilizer are the same as that indicated in Examples 5 to 7 below, as well as throughout the preceding description.

The following examples illustrate the invention. In each of these examples the reaction media were substantially free of iron, copper, and like metal ions which are known to catalyze the decomposition of hydrogen peroxide.

EXAMPLE 1

The following example illustrates the relative stability of hydrogen peroxide alone in the acid concentrations employed in this process:

A solution containing 177 g. of 61 percent $H_2SO_4$ and 33 g. of 30 percent hydrogen peroxide, was stirred for 2 days at 50° C. The initial concentration was 4.7 percent weight hydrogen peroxide in 51 percent $H_2SO_4$. Aliquots were removed periodically and titrated for hydrogen peroxide. It was found that less than 2 percent of the hydrogen peroxide had decomposed during the 2-day period.

EXAMPLE 2

The following example illustrates the substantial absence of hydrogen peroxide as a reaction product in the conversion of an hydroperoxide to a peroxide by treatment with acid:

Nine grams (0.1 moles) of t-butylhydroperoxide were added to 25 cc. of 50 weight percent aqueous $H_2SO_4$ and stirred at 50° C. for 15 hours. Phase separation yielded 6.75 g. (0.46 moles) of di-t-butylperoxide (92 percent of theory) and a water white acid phase that contained only traces of hydrogen peroxide (1 percent of theory).

EXAMPLE 3

The following example illustrates the marked instability of hydrogen peroxide in the presence of the hydroperoxide and acid starting materials:

A solution containing 9 g. (0.1 mole) t-butylhydroperoxide, 3.1 g. hydrogen peroxide, 37 g. 96 percent sulfuric acid and 31 g. water were stirred at 50° C. for 15 hours. The overall acidity was approximately 50 weight percent and the conditions were similar to those of Example 2 except that hydrogen peroxide was added to see if it would survive the reaction. Analysis showed only traces of hydrogen peroxide (1 percent of theory) and a 50 percent yield of t-Bu$_2$O$_2$.

EXAMPLE 4

The following example illustrates the marked instability of hydrogen peroxide in the presence of the peroxide and acid found in the final reaction medium:

A solution containing 7.3 g. (0.05 mole) di-t-butylperoxide, 3.1 g. hydrogen peroxide, 37 g. 96 percent H$_2$SO$_4$ and 31 g. H$_2$O were stirred at 50° C. for 15 hours. This was the same as Example 3 except t-Bu$_2$O$_2$ was employed instead of t-BuOOH. Analysis showed only traces of hydrogen peroxide (1 percent) and 40 percent of the t-Bu$_2$O$_2$ was destroyed.

The following examples illustrate the process of this invention.

EXAMPLE 5

A solution containing 9.0 g. (0.1 mole) of t-BuOOH in 33 g. of 50 percent weight aqueous H$_2$SO$_4$ with 1.0 g. of sodium stannate (Na$_2$SnO$_3$·b3H$_2$O) was stirred at 50° C. for 15 hours. Analysis of the acid layer showed that 1.1 g. of hydrogen peroxide (63 percent of theory) was present. A 90 percent yield of t-Bu$_2$O$_2$ was also obtained.

EXAMPLE 6

In accordance with the procedure of Example 5, but substituting 11.6 g. of 1-methycyclopentylhydroperoxide for t-butylhydroperoxide, and 1.3 g. of the reaction product of orthophosphoric acid and stannous chloride (prepared in accordance with U.S. Pat. No. 2,091,178) for Na stannate, there is obtained a mixture of di-1-methylcyclopentylperoxide and hydrogen peroxide in good yield.

EXAMPLE 7

In accordance with the procedure of Example 5, but substituting sec.-butylhydroperoxide for t-butylhydroperoxide, there is obtained in good yield a mixture of di-sec.-butylperoxide and hydrogen peroxide.

The foregoing examples show that while hydrogen peroxide is relatively stable in acid concentration alone (Example 1), unexpectedly it was found to be highly unstable in the presence of both alkylhydroperoxides (Example 3) and the dialkylperoxide product (Example 4). While applicant does not wish to be bound by any particular theoretical considerations, it would appear that this is the reason that no hydrogen peroxide was found in the prior art conversion of alkylhydroperoxides to the corresponding peroxide (Example 2 and U.S. Pat. No. 2,522,016). Therefore, by identifying this problem (Examples 3 and 4), and, as shown by Examples 5 to 7, resolving it by finding that certain additives made the formation of hydrogen peroxide possible in the presence of peroxides and acid where the art taught that none is evolved, there has been provided a novel method, and thus a new source, for obtaining hydrogen peroxide while simultaneously producing di-alkylperoxide.

What is claimed is:

1. A process for the simultaneous production of hydrogen peroxide and aliphatic or alicyclic peroxides which comprises reacting a secondary or tertiary aliphatic or alicyclic hydroperoxide at a temperature of from about 40° to 65° C. with an aqueous acid in the presence of from 0.01 to 3.0 g. of an alkali metal stannate or the reaction product of orthophosphoric acid and a stannous halide for each 9 to 10 g. of hydroperoxide starting material, wherein the concentration of the acid is from about 30 to 65 weight percent based on the total weight of the acid and water.

2. The process according to claim 1 wherein the stannate salt is sodium stannate.

3. The process according to claim 1 wherein the acid concentration is from about 45 to 55 weight percent based on the total weight of the acid and water.

4. The process according to claim 1 wherein the aliphatic hydroperoxide is t-butylhydroperoxide.

5. A process for the stabilization of hydrogen peroxide in an aqueous acid medium containing an aliphatic or alicyclic peroxide which comprises adding from about 0.01 to 3.0 g. of an alkali metal stannate or the reaction product of orthophosphoric acid and a stannous halide for each 9 to 10 g. of hydroperoxide starting material to said aqueous acidic medium, wherein the concentration of the acid is from about 30 to 65 weight percent based on the total weight of the acid and water.

* * * * *